United States Patent
Zhao et al.

(10) Patent No.: US 12,505,879 B2
(45) Date of Patent: Dec. 23, 2025

(54) GRAY ENCODING FOR ANALOG CONTENT ADDRESSABLE MEMORY IN GENERAL COMPUTING

(71) Applicant: Hewlett Packard Enterprise Development LP, Spring, TX (US)

(72) Inventors: Lei Zhao, Fort Collins, CO (US); Giacomo Pedretti, San Francisco, CA (US); Ron M. Roth, Haifa (IL)

(73) Assignee: Hewlett Packard Enterprise Development LP, Spring, TX (US)

( * ) Notice: Subject to any disclaimer, the term of this patent is extended or adjusted under 35 U.S.C. 154(b) by 113 days.

(21) Appl. No.: 18/668,540

(22) Filed: May 20, 2024

(65) Prior Publication Data
US 2025/0356917 A1 Nov. 20, 2025

(51) Int. Cl.
*G11C 15/04* (2006.01)
*G11C 7/08* (2006.01)
*G11C 7/10* (2006.01)

(52) U.S. Cl.
CPC ............... *G11C 15/04* (2013.01); *G11C 7/08* (2013.01); *G11C 7/1096* (2013.01)

(58) Field of Classification Search
CPC .......................... G11C 13/004; G11C 13/0004
See application file for complete search history.

(56) References Cited

U.S. PATENT DOCUMENTS

| | | | |
|---|---|---|---|
| 11,978,523 B1* | 5/2024 | Roth | G11C 29/42 |
| 2015/0055405 A1* | 2/2015 | Shiratake | G11C 11/418 |
| | | | 365/158 |

OTHER PUBLICATIONS

Zhao et al., "RACE-IT a Reconfigurable Analog CAM-Crossbar Engine for In-Memory Transformer Acceleration", 2023, pp. 1-13.

* cited by examiner

*Primary Examiner* — Han Yang
(74) *Attorney, Agent, or Firm* — Slater Matsil, LLP

(57) ABSTRACT

A device includes a first programmable computing block with an analog content addressable memory array, sense amplifiers, inverters, and a format converter circuit. The array includes analog content addressable memory cells arranged in rows and columns. The format converter circuit is configured to receive a Gray code from the inverters and convert it to a binary code. The device may also include additional programmable computing blocks. A system calculates decimal outputs of a predetermined function for a set of decimal inputs, encodes the outputs into Gray codes, generates mappings associating ranges of the decimal inputs with values for bit positions within the Gray codes, and programs the analog content addressable memory device based on the mappings to directly output the values for the bit positions.

20 Claims, 11 Drawing Sheets

GRAY ENCODING FOR ANALOG CONTENT ADDRESSABLE MEMORY IN GENERAL COMPUTING

BACKGROUND

Content addressable memory (CAM) is a type of computing memory used in high-speed searching applications. In CAM, stored data is not searched by its location, but rather by its content. An input value is supplied and the CAM searches its memory to see if that input value is stored in the memory.

Analog Content Addressable Memory (aCAM) is a type of CAM that can store a range of values in its cell, rather than a single value. This makes aCAM particularly useful for accelerating algorithms with tabular data. The aCAM cell structure can be designed to store ranges with varying levels of precision, enhancing its applicability to real-world machine learning algorithms that often require high precision. aCAMs are powerful, efficient, and fast.

BRIEF DESCRIPTION OF THE DRAWINGS

For a more complete understanding of this disclosure, and advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the disclosure and are not necessarily drawn to scale.

DESCRIPTION

Figure 1:
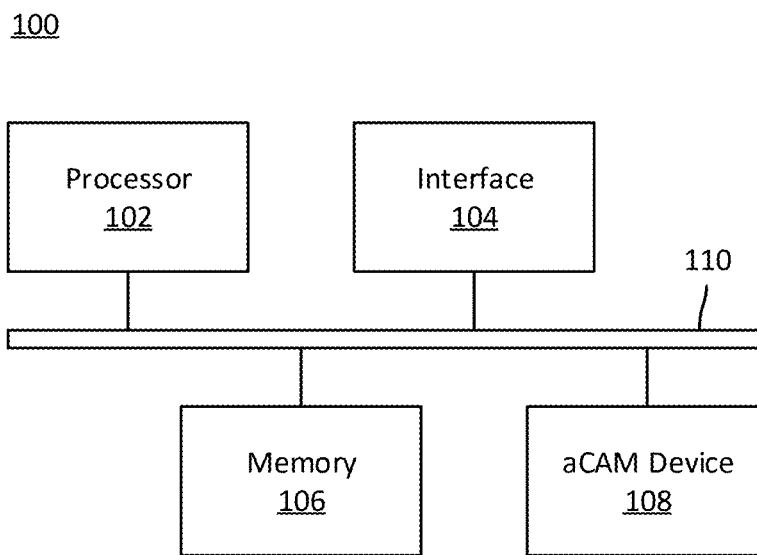
FIG. 1 is a block diagram of a computing system, according to some implementations.

The following disclosure provides many different examples for implementing different features. Specific examples of components and arrangements are described below to simplify the present disclosure. These are, of course, merely examples and are not intended to be limiting.

The present disclosure relates generally to analog content addressable memory (aCAM) and, more particularly, to a device and method for utilizing aCAM in general computing applications. The described implementations provide techniques for storing and comparing analog input values against stored ranges within aCAM cells of an aCAM device, enabling output (from the aCAM cells) of Gray codes for various functions. A Gray code may be converted to a binary code for direct output from the aCAM device. This approach eliminates the dependency on separate memory arrays for storing precomputed results, which is common in traditional CAM/aCAM-based computing schemes.

The disclosed technique involves calculating decimal outputs for a predetermined function based on a set of decimal inputs, encoding these outputs into Gray codes, and generating mappings that associate ranges of decimal inputs with bit values within the Gray codes. The decimal inputs are real-valued inputs to the function, while the decimal outputs are real-valued outputs from the function. These mappings are programmed into aCAM cells of an aCAM device. Thus, the aCAM device may receive an input value (corresponding to a decimal input to the predetermined function), produce a Gray code (corresponding to a decimal output from the predetermined function), and convert the Gray code to a binary code for direct output in a single lookup operation. In other words, the aCAM device directly outputs a binary code corresponding to a decimal output of the function when provided with a corresponding input value.

A bit of a Gray code is generated by a row of the aCAM cells, where cell(s) in the row may store range(s) (or groups) of input values that would result in that particular bit being '1'. If an aCAM cell in a row matches (in the analog domain) with the input value, the row outputs a '1' for that bit position; otherwise, it outputs a '0'. Thus, each bit of the Gray code may be directly produced by a row of the aCAM cells.

Grouping and storing the analog input ranges that make a specific bit of the Gray code equal to '1' obviates the need to separately store each precomputed result of a function. The footprint of the aCAM device may thus be reduced. Additionally, a computation process may be streamlined into a single-shot lookup operation, rather than requiring multiple search and memory access steps, thus improving the overall computational performance.

Gray coding is used to encode the decimal outputs of the predetermined function into codes. Gray coding is a numeral system where two successive values differ by only one bit, which simplifies the encoding and decoding processes as compared to binary coding. Using Gray coding reduces the quantity of decimal input ranges which are associated with bit values within the Gray codes. Specifically, the quantity of decimal input ranges associated with a particular bit value may be reduced by up to half. The size of the mapping programmed into an aCAM device may thus be reduced, which may reduce the number of aCAM cells needed in the aCAM device. This may lead to a corresponding reduction in area, latency, and power consumption of the aCAM device.

The aCAM device further includes a format converter circuit connected to the aCAM cells. The format converter circuit is configured to convert the output of the aCAM cells from a Gray code to a binary code. A binary code, unlike a Gray code, is a standard binary representation (e.g., a base-2 representation) of a number. The output of the format converter circuit may thus be read by any suitable digital component, such as a digital-to-analog converter, processor, or the like.

FIG. 1 is a block diagram of a computing system 100, which may be used to process a machine learning model, according to some implementations. The computing system 100 may be implemented in an electronic device. Examples of electronic devices include host devices (e.g., servers, personal computers, mobile devices, etc.), network devices (e.g., routers, switches, access points, etc.), and the like.

The computing system 100 may be utilized in any data processing scenario, including stand-alone hardware, mobile applications, or combinations thereof. Further, the computing system 100 may be used in a computing network, such as a public cloud network, a private cloud network, a hybrid cloud network, other forms of networks, or combinations thereof. In one example, the methods provided by the computing system 100 are provided as a service over a network by, for example, a third party. The computing system 100 may be implemented on one or more hardware platforms, in which the modules in the system may be executed on one or more platforms. Such modules may run on various forms of cloud technologies and hybrid cloud technologies or be offered as a Software-as-a-Service that may be implemented on or off a cloud network.

To achieve its desired functionality, the computing system 100 includes various hardware components. These hardware components may include a processor 102, an interface 104, a memory 106, and an aCAM device 108. The hardware components may be interconnected through a number of busses and/or network connections. In one example, the processor 102, the interface 104, the memory 106, and the aCAM device 108 may be communicatively coupled via a bus 110, such as a PCI-Express bus.

The processor 102 retrieves executable code from the memory 106 and executes the executable code. The executable code may, when executed by the processor 102, cause the processor 102 to implement any functionality described herein. The processor 102 may be a microprocessor, an application-specific integrated circuit, a microcontroller, or the like.

The interface 104 enables the processor 102 to interact with various other hardware components, external and internal to the computing system 100. For example, the interface 104 may include interface(s) to input/output devices, such as, for example, a display device, a mouse, a keyboard, etc. Additionally or alternatively, the interface 104 may include interface(s) to storage devices, network devices, host devices, or the like.

The memory 106 may include various types of memory, including volatile and nonvolatile memory. For example, the memory 106 may include Random-Access Memory (RAM), Read-Only Memory (ROM), a Hard Disk Drive (HDD), and/or the like. Different types of memory may be used for different data storage needs. For example, the processor 102 may boot from ROM, maintain nonvolatile storage in an HDD, execute program code stored in RAM, and store data under processing in RAM. The memory 106 may include a non-transitory computer readable medium that stores instructions for execution by the processor 102. One or more modules within the computing system 100 may be partially or wholly embodied as software and/or hardware for performing any functionality described herein.

The aCAM device 108 is an accelerator. For example, the aCAM device 108 may be used by the processor 102 to accelerate processing of a machine learning model. The aCAM device 108 is different than the processor 102. The aCAM device 108 includes aCAM cells, which are used for computing instead of data storage for the processor 102. Specifically, each aCAM cell has a structure that allows the aCAM device 108 to compute the output a predetermined function with one or more input variable(s). The function may be a one-variable function or a multi-variable function. The aCAM device 108 may be able to process the function more efficiently than a general-purpose central processing unit (e.g., the processor 102). Accordingly, the aCAM device 108 may improve the performance of the computing system 100.

Figure 2:
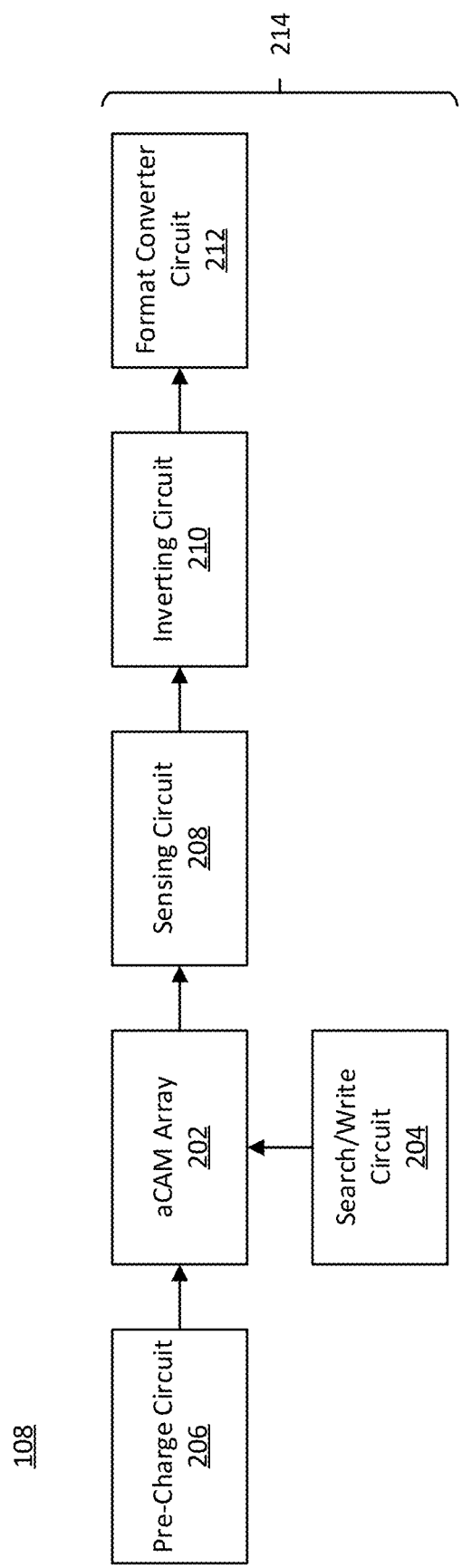
FIG. 2 is a block diagram of an aCAM device, according to some implementations.

FIG. 2 is a block diagram of the aCAM device 108, according to some implementations. The aCAM device 108 includes an aCAM array 202 as well as multiple peripheral circuits used for programming and operating the aCAM array 202. For example, the peripheral circuits may further include a search/write circuit 204, a pre-charge circuit 206, a sensing circuit 208, an inverting circuit 210, and a format converter circuit 212. As subsequently described in greater detail, the aCAM device 108 is configured to receive an input value (corresponding to an input to a predetermined function) and output a binary code (corresponding to an output from the predetermined function).

The aCAM array 202 includes multiple aCAM cells (subsequently described), which may be arranged in rows and columns. The aCAM cells search multi-level voltages and store analog ranges in their memory. One or more range(s) may be programmed for each aCAM cell of the aCAM array 202. The aCAM array 202 may be programmed with ranges that are used to compute the output of the predetermined function.

During a search operation, one or more analog input values are input to the aCAM array 202 over data lines. One or more aCAM cells in the aCAM array 202 (e.g., a row of aCAM cells, also referred to as a "aCAM row") then indicates whether the analog input values are matched by their stored range(s). The stored range(s) encoded in an aCAM cell are compared against a respective analog input value. Depending on the implementation of an aCAM cell, a match may occur when an analog input value is inside of the range stored in the aCAM cell or a match may occur when an analog input value is outside of the range stored in the aCAM cell. During a write operation, one or more analog input values are communicated to one or more aCAM cells of the aCAM array 202. The stored range(s) in an aCAM cell are encoded based on a respective analog input value.

The search/write circuit 204 performs a search operation or a write operation for the aCAM array 202. The search/write circuit 204 may include a digital-to-analog converter (DAC), drivers, and the like. The DAC is used to apply write voltages to aCAM cells of the aCAM array 202 during a write operation, and to apply search voltages to aCAM cells of the aCAM array 202 during a search operation. The search/write operations may involve setting appropriate analog voltage levels to represent desired analog input values. For example, the DAC may apply write voltages to program the stored range(s) for aCAM cells of the aCAM array 202, or may apply search voltages to test whether the search voltages are matched by the range(s) programmed in aCAM cells of the aCAM array 202. Specifically, the search/write circuit 204 may apply voltages to data lines of the aCAM array 202, such as via appropriate drivers.

An input value may be provided to the aCAM device 108 in the digital domain or in the analog domain. In some implementations, the search/write circuit 204 may receive a digital input value, convert the digital input value to an analog input value, and provide the analog input value to the aCAM array 202. In some implementations, the search/write circuit 204 may receive an analog input value and provide the analog input value to the aCAM array 202.

The pre-charge circuit 206 pre-charges a match line for one or more CAM cells (e.g., an aCAM row) of the aCAM array 202 to a voltage $V_{ml}$ before a search operation begins. During a search operation, the match line of the aCAM cells remains high (e.g., remains at the voltage $V_{ml}$) to indicate a match if the analog input values applied to the aCAM cells are matched by the range(s) stored in the aCAM cells. Alternatively, the match line goes low (e.g., the voltage $V_{ml}$ drops) as a current in the match line discharges through pull-down transistors of an aCAM cell to indicate a mismatch if the analog input values applied to the aCAM cells are not matched by the range(s) stored in the aCAM cells.

The sensing circuit 208 senses the outputs of the aCAM cells of the aCAM array 202. The sensing circuit 208 may include a sense amplifier for each aCAM row. The match line of each aCAM row is connected to a sense amplifier. A sense amplifier may be used during a search operation to detect if a match line of an aCAM row is high (indicating a match with one or more analog input values) or low (indicating a mismatch with the analog input values).

The inverting circuit 210 is connected to the sensing circuit 208. This connection allows the inverting circuit 210 to receive the detected outputs from the sensing circuit 208. The inverting circuit 210 may include an inverter for each sense amplifier. The sense amplifier of each aCAM row is connected to an inverter. As previously alluded to, each match line of the aCAM array 202 is either high (indicating a match with analog input values) or low (indicating a mismatch with analog input values), and the state of each match line is determined by the sensing circuit 208. The inverting circuit 210 is used to invert the logical states of the match lines (determined by the sensing circuit 208). Thus, if a match line is high (indicating a match) the inverting circuit 210 flips that state to low. Similarly, if a match line is low (indicating a mismatch) the inverting circuit 210 flips that state to high. The purpose of inverting the match lines will be subsequently described.

The format converter circuit 212 is connected to the inverting circuit 210. This connection allows the format converter circuit 212 to receive the inverted outputs from the inverting circuit 210. The format converter circuit 212 may include a series of exclusive OR (XOR) gates arranged in a cascading configuration to perform the conversion from Gray codes to binary codes. As subsequently described in greater detail, the aCAM array 202 may be programmed such that the inverting circuit 210 outputs a digital value as a Gray code. The format converter circuit 212 converts the Gray code output from the inverting circuit 210 into a binary code. This conversion allows the output of the inverting circuit 210, which is in Gray format, to be converted into a more universally recognized binary format. This binary output can then be easily processed by other components of the aCAM device 108 (or the computing system 100 more generally).

The aCAM device 108 may also include a controller (not separately illustrated) for controlling the components of the aCAM device 108. For example, the controller may control the format converter circuit 212, the inverting circuit 210, the sensing circuit 208, the pre-charge circuit 206, and the search/write circuit 204. The controller may include a digital control circuit such as a microcontroller, an application-specific integrated circuit, or the like. The digital control circuit provides necessary control signals and data to the sensing circuit 208 and the search/write circuit 204. For example, the digital control circuit may be used to drive the DAC of the search/write circuit 204, as well as control and coordinate the operation of the DAC. The controller may include other components, such a clock circuit for temporalizing operations in the aCAM device 108.

The components illustrated and described for FIG. 2 make up a programmable computing block 214 of the aCAM device 108. The programmable computing block 214 may be programmed to provide precomputed digital outputs for a predetermined function. The computing block accepts a digital input in binary format (via the search/write circuit 204) from a component, produces an intermediate digital code in Gray format, converts the intermediate digital code to binary format (via the format converter circuit 212), and provides the binary formatted digital code to another component. Thus, the digital input/output of the programmable computing block 214 are both in binary format.

In this implementation, the aCAM device 108 includes a single programmable computing block 214. In another implementation (subsequently described), the aCAM device 108 may include multiple programmable computing blocks 214. Each programmable computing block 214 may include its own aCAM array and associated peripheral circuits, similar to those described in FIG. 2. These multiple programmable computing blocks 214 can operate in parallel or in series, depending on the computational requirements and the architecture of the system. This modular approach allows for scalability and flexibility in the system design.

The aCAM device 108 could be implemented as an integrated circuit (IC) on a semiconductor substrate using suitable microfabrication techniques. Such an IC would integrate the aCAM array 202, the search/write circuit 204, the pre-charge circuit 206, the sensing circuit 208, the inverting circuit 210, the format converter circuit 212, and any other components onto a single chip. The resulting IC may be packaged and integrated into larger systems.

Figure 3:
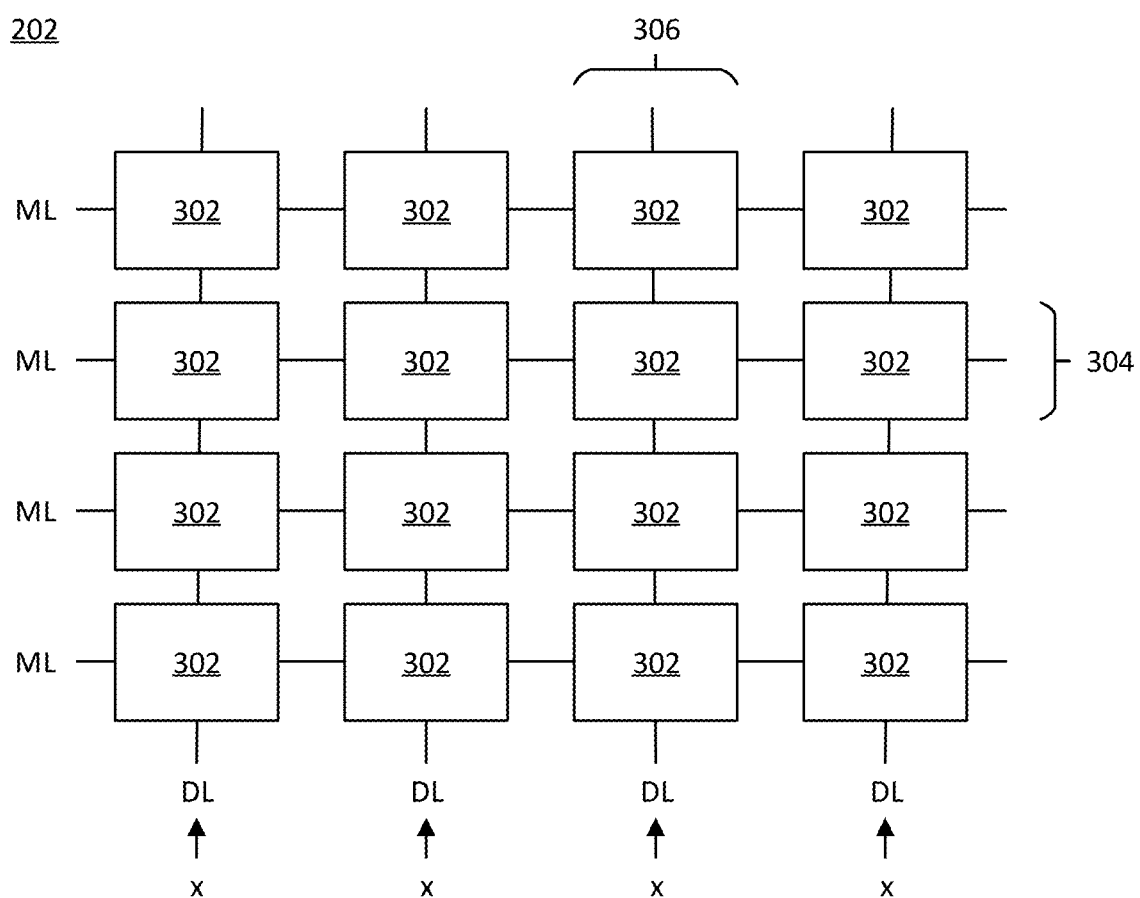
FIG. 3 is a block diagram of an aCAM array, according to some implementations.

FIG. 3 is a block diagram of the aCAM array 202, according to some implementations. The aCAM array 202 will be used for computing instead of for data storage. The aCAM array 202 includes multiple aCAM cells 302, which may be arranged in aCAM rows 304 and aCAM columns 306.

The aCAM cells 302 may be OR-type aCAM cells or AND-type aCAM cells. An OR-type aCAM cell stores range(s) and indicates a match when analog input value(s) are outside of the stored range(s). An AND-type aCAM cell stores range(s) and indicates a match when analog input value(s) are inside of the stored range(s).

In this implementation, each aCAM cell 302 stores a single range, against which a single analog input value x is compared. Thus, a single analog input value x is provided to each aCAM cell 302 on the data line DL. In another implementation (subsequently described for FIG. 8), each aCAM cell 302 stores multiple ranges, against which respective analog input values are compared.

The aCAM array 202 includes data lines DL arranged along the aCAM columns 306 and match lines ML arranged along the aCAM rows 304. The aCAM array 202 is configured to receive the analog input value x on each of the data lines DL. The analog input value x represents a decimal input to a predetermined function. The aCAM cells 302 are programmed with ranges that are used to compute the output the predetermined function for the analog input value x.

Each data line DL is connected to data line nodes of the aCAM cells 302 along an aCAM column 306. Each aCAM column 306 receives, as input during a search operation, the analog input value x on a respective data line DL. Thus, each aCAM cell 302 compares its stored range against the analog input value x.

Each match line ML is connected to match line nodes of the aCAM cells 302 along an aCAM row 304. The match lines ML are pre-charged to a voltage $V_{ml}$ before a search operation begins. A match line ML remaining high during a search operation indicates that the analog input value x is matched by the ranges stored in the aCAM cells 302 along an aCAM row 304. In other words, a match line ML indicates whether the analog input value x matches all of the ranges stored in the aCAM cells 302 along an aCAM row 304.

Figure 4:
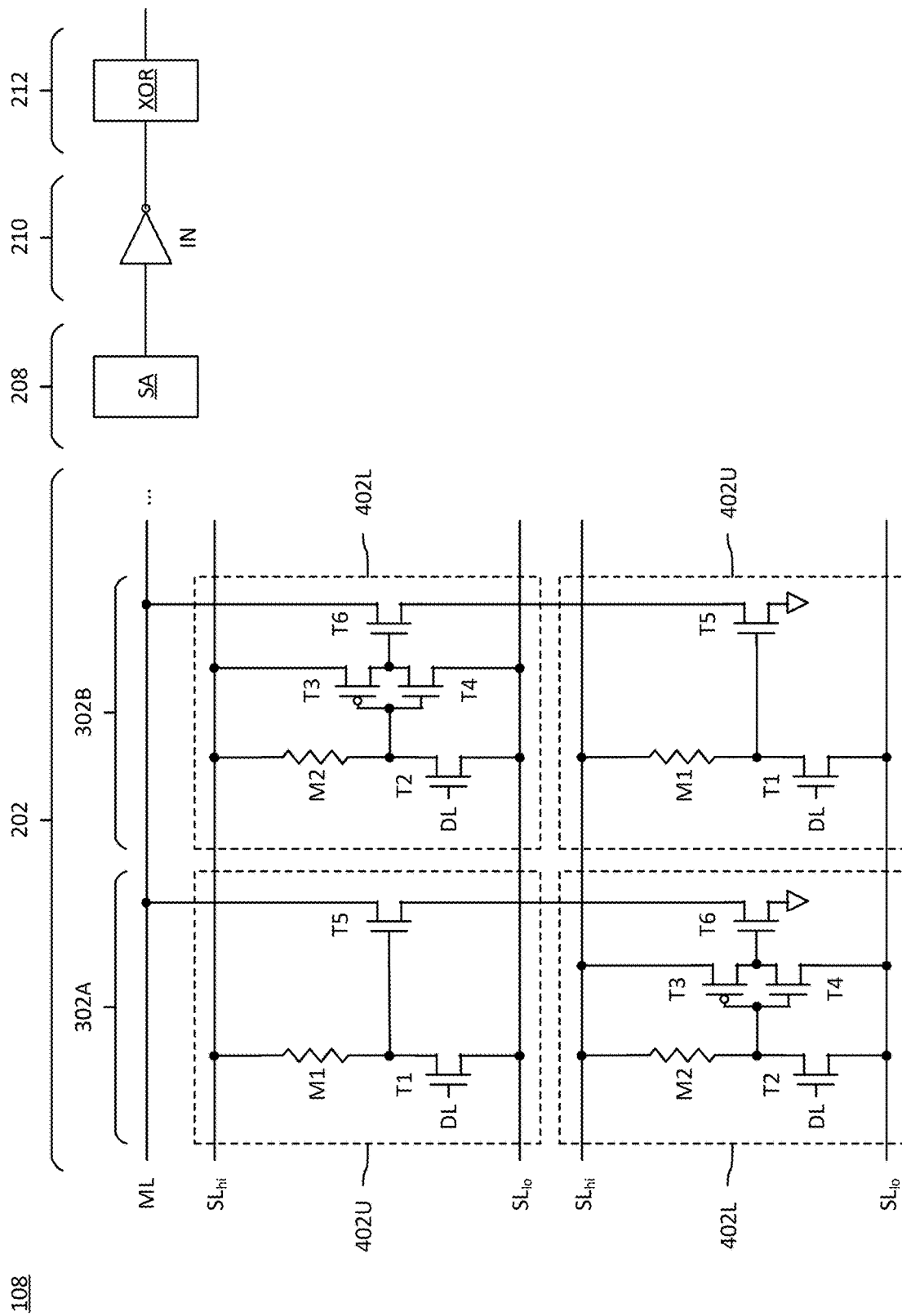
FIG. 4 shows a circuit configuration for an aCAM device, according to some implementations.

FIG. 4 shows a circuit configuration for the aCAM device 108, according to some implementations. Details of one aCAM row of the aCAM device 108 of FIG. 3 are shown. Specifically, FIG. 4 illustrates a portion of the aCAM array 202, a portion of the sensing circuit 208, a portion of the inverting circuit 210, and a portion of the format converter circuit 212 for the aCAM row. For the aCAM array 202, two aCAM cells (including an aCAM cell 302A and an aCAM cell 302B) of the aCAM row are illustrated, along with the match line ML of the aCAM row.

The aCAM cells 302 are coupled to the match line ML. The aCAM cells 302 are OR-type aCAM cells that store a single range. An OR-type aCAM cell stores a range and may be used to test whether an analog input value is outside of the stored range. As used herein, a range refers to a range of voltages that is stored in an aCAM cell 302, where the range of voltages is defined by an upper bound and a lower bound.

Each aCAM cell 302 is shown as an example having a six-transistor-two-memristor (6T2M) circuit implementation. Specifically, an aCAM cell 302 includes six transistors (e.g., T1-T6) and two memristors (e.g., a first memristor M1 and a second memristor M2). An aCAM cell 302 is connected to the match line ML, a data line DL, a high source line $SL_{hi}$, a low source line $SL_{lo}$, and a reference node (or ground).

A memristor is a non-volatile electronic memory device, whose resistance can be programmed. Thus, analog values can be stored in (or encoded on) the aCAM cell 302 by programming the conductances of the memristors M1/M2. The range stored in an aCAM cell is defined by an upper bound (encoded by a conductance of the first memristor M1) and a lower bound (encoded by a conductance of the second memristor M2). The conductance of a memristor may be programmed by imposing a voltage (corresponding to the desired conductance) across the memristor. In the illustrated example, the transistors T1-T6 can be implemented as metal-oxide semiconductor field-effect transistors (MOSFETs), or the like.

In this implementation, an aCAM cell 302 includes two bound circuits 402 (including an upper bound circuit 402U and a lower bound circuit 402L). Each bound circuit 402 stores a bound of a range by encoding the bound. In some implementations, each bound circuit 402 includes a pull-down transistor, a control transistor, and a memristor for encoding the bound. Additionally, each bound circuit 402 compares its stored bound to an analog input value on the data line DL. Specifically, the upper bound circuit 402U stores the upper bound of the range, and compares the upper bound to an analog input value on the data line DL. Likewise, the lower bound circuit 402L stores the lower bound of the range, and compares the lower bound to the analog input value on the data line DL.

The upper bound circuit 402U includes a memory circuit (including a first memristor M1 and a control transistor T1) and a pull-down transistor T5. The first memristor M1 is connected in series with the control transistor T1, which can be considered as a first memristor-transistor pair M1/T1. The output of the memristor-transistor pair M1/T1 (or the memory circuit) is connected to the gate of the pull-down transistor T5.

The lower bound circuit 402L includes a memory circuit (including a second memristor M2, a control transistor T2, and an inverter) and a pull-down transistor T6. The second memristor M2 is connected in series with a control transistor T2, which can be considered as a memristor-transistor pair M2/T2. The output of the memristor-transistor pair M2/T2 (or the memory circuit) is inverted, via the inverter that includes transistors T3-T4, and the output of that inverter is connected to the gate of the pull-down transistor T6.

The pull-down transistors T5-T6 are connected in series between the match line ML and reference node. Thus, the match line ML may only be pulled to ground if both of the pull-down transistors T5-T6 are turned on. The transistor T5 may be connected between the match line ML and the transistor T6 (as in the example of the aCAM cell 302A) or the transistor T6 may be connected between the match line ML and the transistor T5 (as in the example of the aCAM cell 302B).

During a write operation, programming voltages are applied to the first memristor M1 and the second memristor M2 to program the range for the aCAM cell 302. This is done by applying a voltage to the high source line $SL_{hi}$, to increase the conductance of the first memristor M1 and/or the second memristor M2, and applying a voltage to the low source line $SL_{lo}$, to decrease the conductance of the first memristor M1 and/or the second memristor M2. A voltage may also be applied to the data line DL during the write operation.

During a search operation, a voltage is applied to the data line DL to provide the analog input value for comparison (in the analog domain) with the range stored in the upper bound circuit 402U and the lower bound circuit 402L. The data line DL is electrically connected to the gate of the control transistor T1 and to the gate of the control transistor T2. Therefore, the aCAM cell 302 receives the analog input value via the data line DL. In operation, the aCAM cell 302 matches when the analog input value is outside of the stored range, defined via the conductances of the first memristor M1 and the second memristor M2.

Whether a match is found between the analog input value (received via the data line DL) and the range (stored in the memristors M1-M2) is indicated over the match line ML. The match line ML is pre-charged to a voltage $V_{ml}$ before a search operation begins. As the search operation is performed, the match line ML remains high (e.g., remains at the voltage $V_{ml}$) to indicate a match if the analog input value applied to the aCAM cell 302 via the data line DL is matched by the stored range that is encoded in the memristors M1-M2. Alternatively, if the analog input value applied to the aCAM cell 302 via the data line DL is not matched by the stored range that is encoded in the memristors M1-M2, the match line ML goes low (e.g., the voltage $V_{ml}$ drops) to indicate a mismatch. The voltage $V_{ml}$ drops because a current in the match line ML discharges through both of the pull-down transistors T5-T6 to ground.

As previously mentioned, the aCAM cells 302 are OR-type aCAM cells. Thus, the match line ML will remain high (indicating a match) if the analog input value is outside of the range stored in each of the aCAM cells 302 connected to the match line ML. Specifically, when the analog input value applied to the aCAM cell 302 via the data line DL is less than an upper bound of the range that is encoded by a conductance of the first memristor M1 and is also greater than a lower bound of the range that is encoded by a conductance of the second memristor M2, the voltage $V_{ml}$ drops as the current in the match line ML discharges through the pull-down transistors T5-T6.

The sensing circuit 208 includes a sense amplifier SA for the aCAM row. The input of the sense amplifier SA is connected to the match line ML. The sense amplifier SA senses the voltage signal in the match line ML, and discriminates between a signal indicating a match (e.g., a high signal) and a signal indicating a mismatch (e.g., a low signal). In this way, the sense amplifier SA is used to determine if each of the aCAM cells 302 matches the analog input value.

The inverting circuit 210 includes an inverter IN for the aCAM row. The input of the inverter IN is connected to the output of the sense amplifier SA. The inverter IN may include any suitable inverter, such as a CMOS inverter. The inverter IN inverts the value indicated on the match line ML. Thus, when the aCAM cells 302 are OR-type aCAM cells, the output of the inverter IN will remain high (indicating a match) if the analog input value is inside of the range stored in any of the aCAM cells 302 connected to the match line ML. The output of the inverter IN is a value of a bit of a Gray code.

In the circuit configuration of FIG. 4 (where an aCAM cell 302A and an aCAM cell 302B are connected to the match line ML) the output of the inverter IN will remain high if the analog input value is inside of the range stored in the aCAM cell 302A or is inside of the range stored in the aCAM cell 302B. That is, the output of the inverter IN may be expressed as $(a \leq x < b) \vee (c \leq x < d)$, where x is the analog input value on the data line DL, a is the lower bound stored in the lower bound circuit 402L of the aCAM cell 302A, b is the upper bound stored in the upper bound circuit 402U of the aCAM cell 302A, c is the lower bound stored in the lower bound circuit 402L of the aCAM cell 302B, and d is the upper bound stored in the upper bound circuit 402U of the aCAM cell 302B. In other words, the aCAM device 108 performs an AND operation within each aCAM cell 302 and an OR operation between the aCAM cells 302.

The format converter circuit 212 may (or may not) include an XOR gate for the aCAM row. The XOR gate is used as part of the conversion logic to convert the output code from Gray format to binary format. Whether or not the format converter circuit 212 includes an XOR gate for an aCAM row depends on which bit of the output code is produced by the aCAM row. The format converter circuit 212 may include an XOR gate for each aCAM row except the aCAM row which produces the most significant bit of the Gray code.

Figure 5:
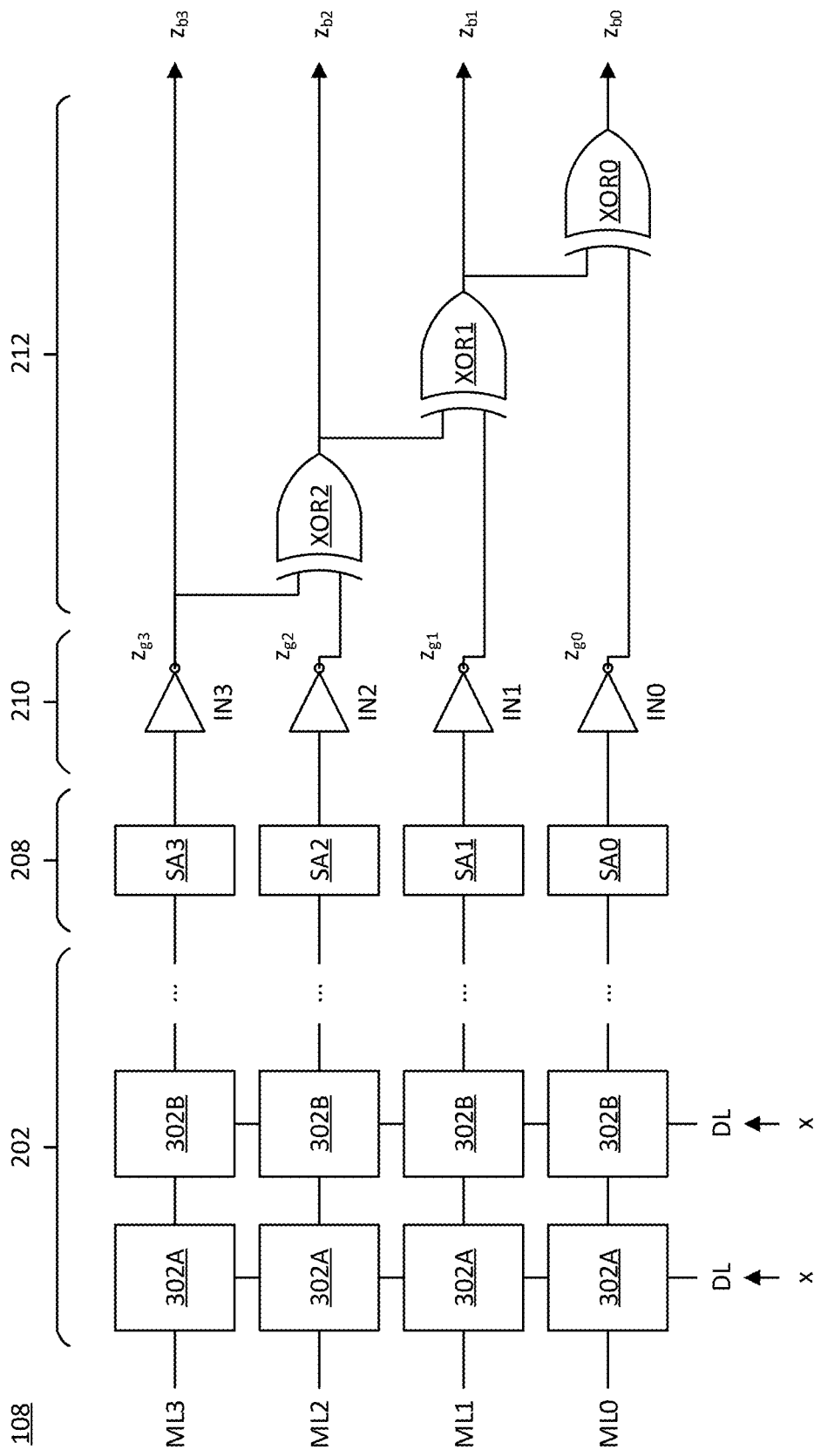
FIG. 5 shows a circuit configuration for an aCAM device, according to some implementations.

FIG. 5 shows a circuit configuration for the aCAM device 108, according to some implementations. Details of multiple aCAM rows of the aCAM device 108 of FIG. 3 are shown. Specifically, FIG. 5 illustrates a portion of the aCAM array 202, a portion of the sensing circuit 208, a portion of the inverting circuit 210, and a portion of the format converter circuit 212. Each aCAM row may include similar components as previously described for FIG. 4.

In this implementation, a single analog input value x is provided to each aCAM cell 302 on the data lines DL. The inverting circuit 210 outputs a plurality of digital output values, which are bits of a Gray code. In this example, the digital output value $z_{g0}$ is the inverse of the value sensed on the match line ML0 and is the value of the $0^{th}$ bit position of the Gray code, the digital output value $z_{g1}$ is the inverse of the value sensed on the match line ML1 and is the value of the $1^{st}$ bit position of the Gray code, the digital output value $z_{g2}$ is the inverse of the value sensed on the match line ML2 and is the value of the $2^{nd}$ bit position of the Gray code, and the digital output value $z_{g3}$ is the inverse of the value sensed on the match line ML3 and is the value of the $3^{rd}$ bit position of the Gray code. The Gray code is then converted (by the format converter circuit 212) to a binary code for output. The format converter circuit 212 outputs a plurality of digital output values, which are bits of an output binary code. In this example, the digital output value $z_{b0}$ is the value of the $0^{th}$ bit position of the output binary code, the digital output value $z_{b1}$ is the value of the $1^{st}$ bit position of the output binary code, the digital output value $z_{b2}$ is the value of the $2^{nd}$ bit position of the output binary code, and the digital output value $z_{b3}$ is the value of the $3^{rd}$ bit position of the output binary code. The output binary code may be in any suitable binary code format which may be readily accepted by a digital component, such as a fixed-point format (e.g., two's complement format, one's complement format, unsigned binary format, etc.), a floating-point format (e.g., IEEE-754 format), or the like. For example, the output of the format converter circuit 212 (e.g., the outputs of the XOR gates) may be directly connected to a processor, a digital-to-analog converter, or the like, for reading the output binary code produced by the aCAM device 108. In some implementations, the Gray code is unsigned and the binary code is signed.

The aCAM device 108 is programmed with a mapping for a predetermined function. This function could be any mathematical or computational function that is used in the specific application of the aCAM device 108. The function could be a simple arithmetic operation, a complicated mathematical function, a machine learning algorithm, or the like. The function is predetermined, meaning it is defined before the aCAM device 108 is programmed and does not change when using the aCAM device 108 to perform a computation.

For the predetermined function, decimal outputs are precomputed based on a set of decimal inputs. This precomputation process involves calculating the output of the function for each desired input in the set of decimal inputs. The set of decimal inputs could be a range of values, a list of specific values, or any other collection of decimal numbers. The precomputation process results in a mapping from decimal inputs to decimal outputs for the predetermined function.

The decimal outputs from the precomputation process are then encoded into Gray codes. This encoding process involves converting each decimal output into a Gray code, which is a binary representation of the decimal output. The Gray code for each output is a sequence of binary digits (or bits), where each bit position has a value of '0' or '1'. In the example of FIG. 5, there are four bit positions in the Gray code, where each of the digital output values $z_{g0}$-$z_{g3}$ are a value for one of the bit positions. The length of the Gray code (in other words, the number of bits) depends on the precision requirements of the application.

The aCAM cells 302 in the aCAM device 108 are then programmed based on the mapping from decimal inputs to Gray codes. Each aCAM cell 302 is programmed to store a range of input values that corresponds to a specific Gray code. When an analog input value is provided to the aCAM device 108 (via the data lines DL), the aCAM cells 302 compare the analog input value to their stored ranges. If the analog input value falls within the stored range of an aCAM cell 302, the aCAM cell 302 outputs a match signal. The match signals from the aCAM cells 302 are then used to produce the appropriate Gray code of the precomputed results. This Gray code represents the decimal output of the predetermined function for the given analog input value. A Gray code will be subsequently converted to a binary code by the format converter circuit 212.

As previously alluded to, an aCAM row is used to produce the bit value at one bit position of the output binary code. The aCAM cells 302 along an aCAM row are programmed to store the range(s) of analog input values for which the value of its bit position should be '1'. One or more aCAM cells 302 on an aCAM row may be unused; such unused aCAM cells 302 may be programmed with maximum upper/lower bounds so that they always indicate a match.

The format converter circuit 212 is used to translate the Gray code output from the inverting circuit 210 (e.g., the inverters IN0-IN3) into a binary code. Thus, the Gray code produced by the inverting circuit 210 is used internally by the aCAM device 108, and may not be output from the aCAM device 108. In some implementations, the format converter circuit 212 includes a series of XOR gates XOR0-XOR2 arranged in a cascading configuration to perform this conversion, so that the output binary code accurately reflects the intended value as determined by the aCAM array 202. The format converter circuit 212 may include an XOR gate for each bit of the Gray code, except for one bit of the Gray code, specifically the most significant bit of the Gray code. The binary code output from the format converter circuit 212 is suitable for further processing by digital components within the computing system 100, such as processors or digital-to-analog converters, facilitating integration of the aCAM device 108 into broader computing operations.

In this way, the aCAM device 108 can perform the function of a lookup table for the predetermined function. The aCAM device 108 directly outputs the result of the function for a given input value, without the need for performing the function computation in real time. This can greatly speed up the processing time and reduce the computational resources used, especially for complicated functions or large sets of inputs.

Figure 6:
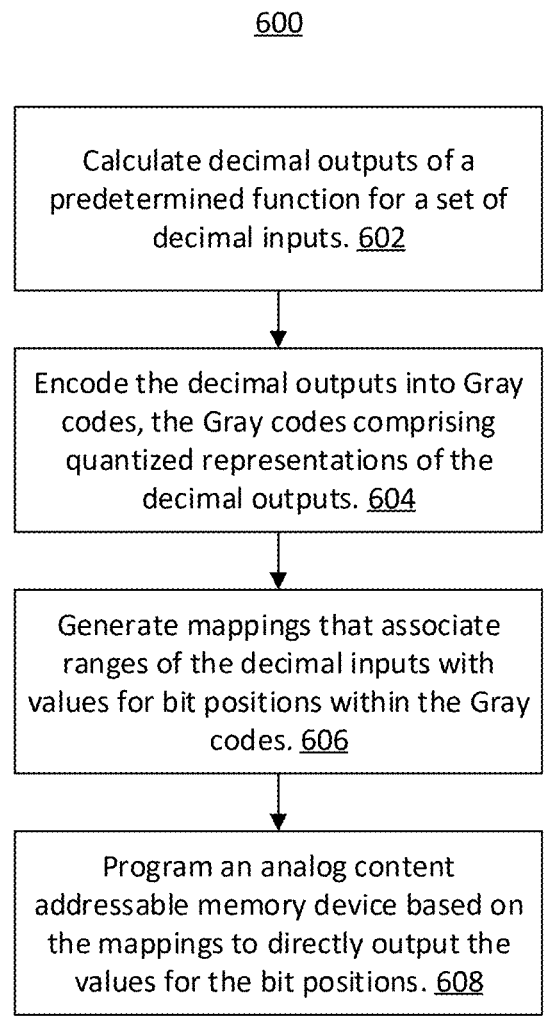
FIG. 6 is a flow diagram of an aCAM function programming method, according to some implementations.

FIG. 6 is a flow diagram of an aCAM function programming method 600, according to some implementations. FIG. 6 will be described in conjunction with FIG. 5. The aCAM function programming method 600 may be implemented by the computing system 100 of FIG. 1 (such as by the processor 102) to precompute results for a predetermined function and then program the aCAM device 108 perform the function of a lookup table for returning the results of the predetermined function.

The computing system may perform a step 602 of calculating decimal outputs of a predetermined function for a set of decimal inputs with a precomputation process. This predetermined function could be any suitable function as previously described. The predetermined function may be a one-variable function (as previously described), a two-variable function (as subsequently described), or the like. The set of decimal inputs may be a specific set of decimal inputs, predetermined by, e.g., a user. The precomputation process involves computing the output of the function for each input in the set of decimal inputs. This precomputation process results in a mapping from decimal inputs to decimal outputs for the predetermined function. The mapping will be used to program the aCAM device 108 in subsequent steps.

The computing system may perform a step 604 of encoding the decimal outputs into Gray codes, the Gray codes comprising quantized representations of the decimal outputs. This encoding process involves translating each decimal output into a Gray code, which is a binary representation of the decimal output. Each Gray code corresponds to a quantized decimal output of the predetermined function. Successive values of the Gray codes differ by only one bit. That is, the Gray codes which correspond to successive decimal outputs only differ by one bit.

In some implementations, the decimal outputs may be quantized before being encoded into Gray codes. Quantization is a process that discretizes continuous or high-precision decimal values into a smaller set of discrete or lower-precision values. By quantizing the decimal outputs, the range of output values can be reduced to fit within the representable range of the Gray codes producible by the aCAM device 108.

The computing system may perform a step 606 of generating mappings that associate ranges of the decimal inputs with values for bit positions within the Gray codes. The mappings link specific ranges of the decimal inputs to corresponding values for each bit position within the Gray codes. This process involves identifying the specific ranges of decimal inputs that would result in particular Gray outputs for the predetermined function. Specifically, for each bit position in the Gray code, the computing system determines the range(s) of decimal inputs that would cause that bit to be '1'. These range(s) are then associated with the corresponding bit position in the Gray code.

This mapping process effectively creates a lookup table that can be used to determine the Gray code for any given decimal input within the specified ranges. Each entry in the lookup table corresponds to a specific range of decimal inputs and the associated bit of the Gray code for that range. The lookup table will be stored in the aCAM cells 302 of the aCAM device 108, and particularly, across the aCAM cells 302 of multiple aCAM rows. The lookup table provides a direct mapping from the specified ranges of the decimal inputs to the Gray codes.

The computing system may perform a step 608 of programming an analog content addressable memory device based on the mappings to directly output the values for the bit positions. This programming is based on the mappings that were generated in step 606. These mappings, which associate specific ranges of decimal inputs with corresponding values for each bit position within the Gray codes, serve as a guide for programming the aCAM device 108.

The programming process involves configuring one or more aCAM cells 302 within the aCAM device 108 to each store a specific range of analog input values. Specifically, the computing system may perform a step of programming memristors of the aCAM device 108 to store the ranges of the decimal inputs of the mapping. This is done by programming the conductances of the memristors within each aCAM cell 302 to represent the upper and lower bounds of the specific range stored in the respective aCAM cell 302. Each row of aCAM cells 302 is thus programmed to store one or more range(s) of analog input values that correspond to a specific bit of a Gray code for the predetermined function.

Once the aCAM device 108 is programmed, it is capable of directly outputting the values for the bit positions of the binary code corresponding to the decimal output of the predetermined function for a given input value. Thus, when an input value is provided to the aCAM device 108, the aCAM device 108 can quickly and efficiently determine which range(s) the input value falls into, directly produce the corresponding Gray code, and convert the Gray code to a binary code. This eliminates the traditional two-step process of searching and memory access, thereby improving the overall computational performance of the aCAM device 108.

Optionally, additional steps may be performed, such as steps for operating the aCAM device 108 to perform a computation. The computing system may perform a step of providing an input value to the aCAM device 108. The input value may be provided in a digital format, which is converted to an analog format by the aCAM device 108. The aCAM device 108 may search the ranges of the decimal inputs stored thereon for the input value and provide the set of the values for the bit positions based on which of the ranges of the decimal inputs (stored in the aCAM cells 302) are matched by the input value. The aCAM device 108 may perform a step of converting the values for the bit positions from Gray representation to binary representation. The computing system may perform a step of obtaining the values for the bit positions from the aCAM device 108.

Figure 7:
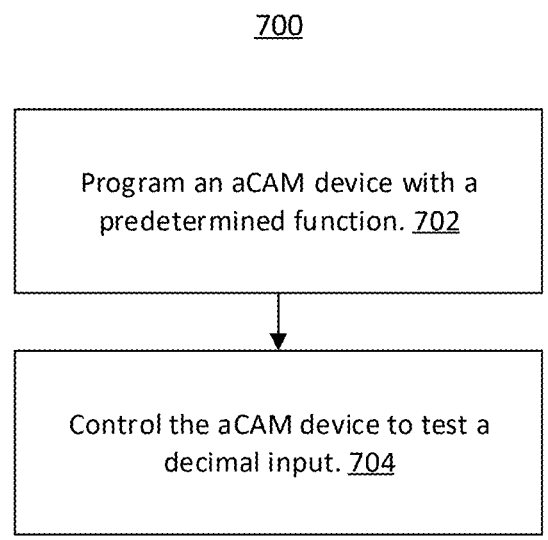
FIG. 7 is a diagram of an aCAM computing method, according to some implementations.

FIG. 7 is a diagram of an aCAM computing method 700, according to some implementations. The aCAM computing method 700 may be implemented by the computing system 100 of FIG. 1 (such as by the processor 102) when using the aCAM device 108 for computing.

The computing system may perform a step 702 of programming an aCAM device 108 with a predetermined function. The aCAM array 202 of the aCAM device 108 may be programmed in a similar manner as previously described for FIG. 6.

The computing system may perform a step 704 of controlling the aCAM device 108 to test an input value. In some implementations, the input value is provided to the search/write circuit 204 of the aCAM device 108 as a digital input value. The search/write circuit 204 may convert the digital input value to an analog input value, which represents a decimal input to the predetermined function. In some implementations, the input value is provided to the search/write circuit 204 of the aCAM device 108 as an analog input value. In either case, the analog input value is provided to the aCAM array 202 by the search/write circuit 204. The inverting circuit 210 outputs a Gray code, which is then converted to a binary code by the format converter circuit 212 and output from the aCAM device 108. The output of the format converter circuit 212 may be directly read (such as by the processor 102) to obtain the result of computing the output of the predetermined function for the decimal input.

Figure 8:
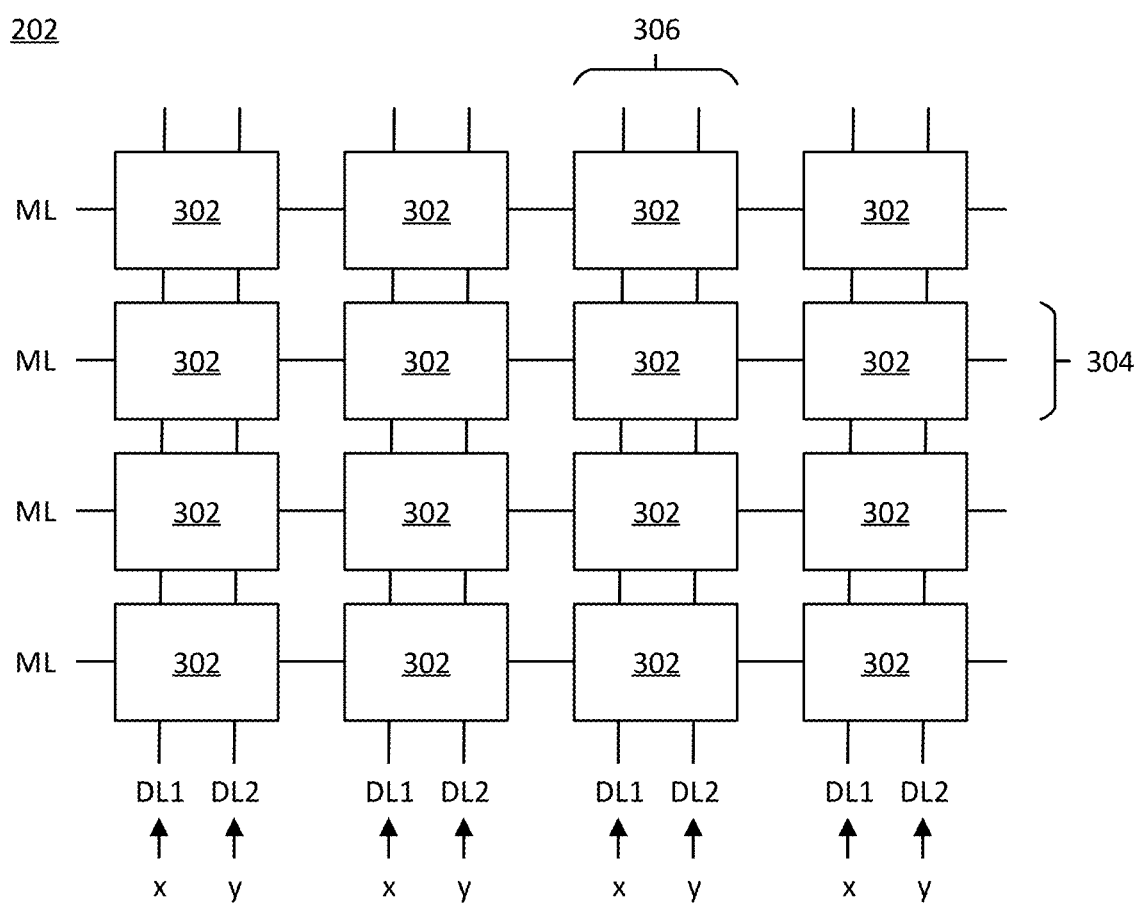
FIG. 8 is a block diagram of an aCAM array, according to some other implementations.

FIG. 8 is a block diagram of the aCAM array 202, according to some other implementations. This implementation is similar to the implementation described for FIG. 3, except each aCAM cell 302 stores multiple ranges, against which respective analog input values are compared. Thus, multiple analog input values x, y are provided to each aCAM cell 302 on multiple data lines DL1, DL2. For example, a first analog input value x will be compared against a first range stored in an aCAM cell 302, while a second analog input value y will be simultaneously compared against a second range also stored in that same aCAM cell 302.

Figure 9:
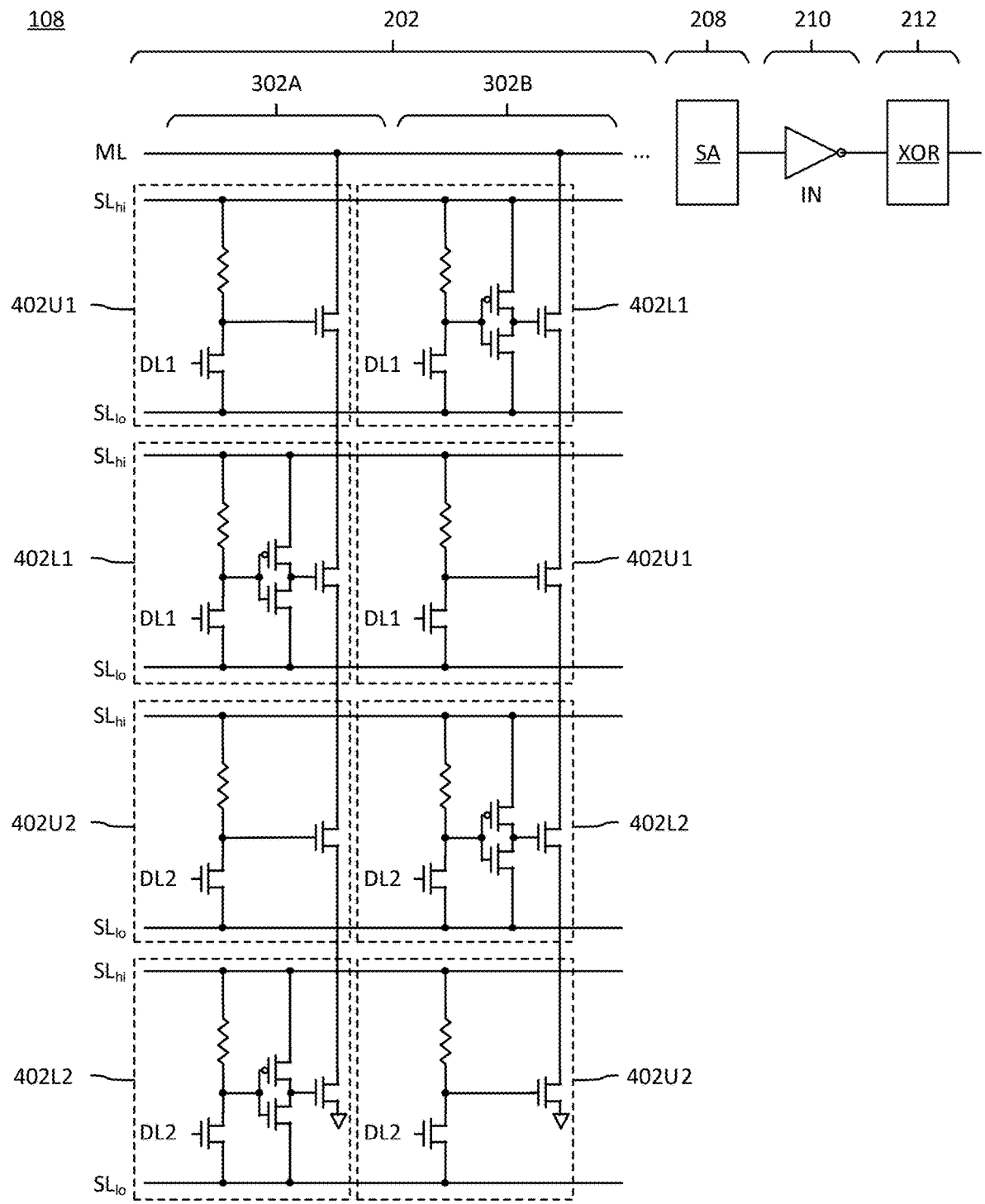
FIG. 9 shows a circuit configuration for an aCAM device, according to some other implementations.

FIG. 9 shows a circuit configuration for the aCAM device 108, according to some other implementations. Details of one aCAM row of the aCAM device 108 of FIG. 8 are shown. This circuit configuration is similar to the circuit configuration described for FIG. 4, except each aCAM cell 302 stores multiple ranges, against which respective analog input values are compared.

In this implementation, an aCAM cell 302 includes two upper bound circuits 402U (including a first upper bound circuit 402U1 and a second upper bound circuit 402U2) and two lower bound circuits 402L (including a first lower bound circuit 402L1 and a second lower bound circuit 402L2). The first upper bound circuit 402U1 stores a first upper bound of a first range while the first lower bound circuit 402L1 stores a first lower bound of that first range. The second upper bound circuit 402U2 stores a second upper bound of a second range while the second lower bound circuit 402L2 stores a second lower bound of that second range. Each bound circuit 402 may have a similar structure as previously described. The four pull-down transistors of the bound circuits within an aCAM cell 302 are connected in series between the match line ML and reference node.

During a search operation, a first voltage is applied to a first data line DL1 to provide a first analog input value x for comparison (in the analog domain) with the first range stored in the first upper bound circuit 402U1 and the first lower bound circuit 402L1. Simultaneously, a second voltage is applied to a second data line DL2 to provide a second analog input value y for comparison (in the analog domain) with the second range stored in the second upper bound circuit 402U2 and the second lower bound circuit 402L2.

In the circuit configuration of FIG. 9 (where an aCAM cell 302A and an aCAM cell 302B are connected to the match line ML) the output of the inverter IN will remain high if: (1) the first analog input value is inside of the first range stored in the aCAM cell 302A and the second analog input value is inside of the second range stored in the aCAM cell 302A or (2) the first analog input value is inside of the first range stored in the aCAM cell 302B and the second analog input value is inside of the second range stored in the aCAM cell 302B. That is, the output of the inverter IN may be expressed as $[(a \leq x < b) \wedge (e \leq y < f)] \vee [(c \leq x < d) \wedge (g \leq y < h)]$, where x is the analog input value on the first data line DL1, y is the analog input value on the second data line DL2, a is the lower bound stored in the lower bound circuit 402L1 of the aCAM cell 302A, b is the upper bound stored in the upper bound circuit 402U1 of the aCAM cell 302A, c is the lower bound stored in the lower bound circuit 402L1 of the aCAM cell 302B, d is the upper bound stored in the upper bound circuit 402U1 of the aCAM cell 302B, e is the lower bound stored in the lower bound circuit 402L2 of the aCAM cell 302A, f is the upper bound stored in the upper bound circuit 402U2 of the aCAM cell 302A, g is the lower bound stored in the lower bound circuit 402L2 of the aCAM cell 302B, and h is the upper bound stored in the upper bound circuit 402U2 of the aCAM cell 302B. In other words, the aCAM device 108 performs an AND operation (with two ranges) within each aCAM cell 302 and an OR operation between the aCAM cells 302.

Figure 10:
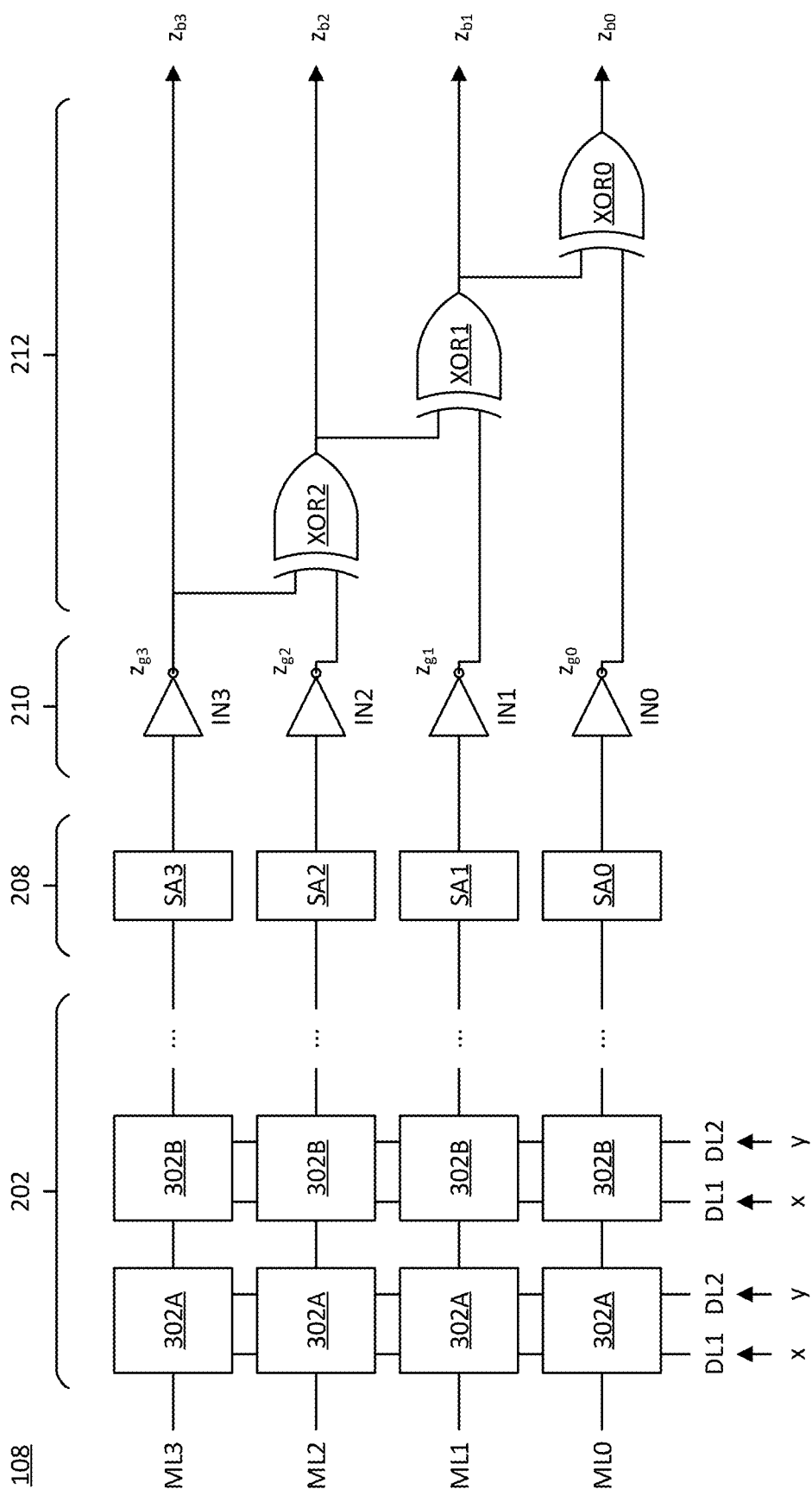
FIG. 10 shows a circuit configuration for an aCAM device, according to some other implementations.

FIG. 10 shows a circuit configuration for the aCAM device 108, according to some implementations. Details of multiple aCAM rows of the aCAM device 108 of FIG. 8 are shown. This circuit configuration is similar to the circuit configuration described for FIG. 5, except multiple analog input values x, y are provided to each aCAM cell 302 on multiple data lines DL1, DL2. Like the circuit configuration described for FIG. 5, the format converter circuit 212 outputs a plurality of digital output values, which are bits of an output binary code. The aCAM device 108 may be programmed with a mapping for a predetermined function, as previously described for FIG. 6.

Figure 11:
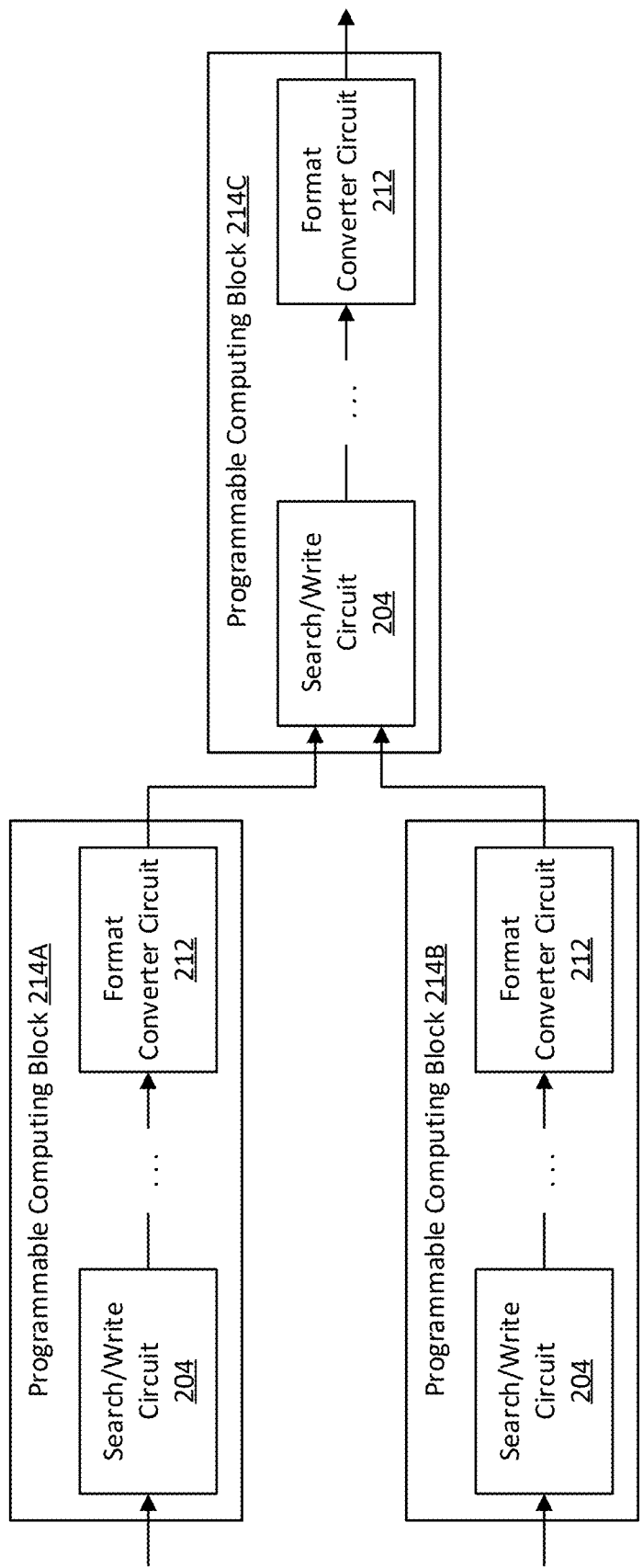
FIG. 11 is a block diagram of an aCAM device, according to some implementations.

FIG. 11 is a block diagram of the aCAM device 108, according to some implementations. In this implementation, the aCAM device 108 includes multiple programmable computing blocks 214. Each programmable computing block 214 may include its own components, similar to those described in FIG. 2.

In this example, two programmable computing blocks, specifically a first programmable computing block 214A and a second programmable computing block 214B, operate in parallel. This parallel operation allows for simultaneous processing of different functions, thereby enhancing the overall computational efficiency of the aCAM device 108.

The first programmable computing block 214A and the second programmable computing block 214B are connected in series with a third programmable computing block 214C. This series connection allows for sequential processing of data, where the outputs from the first programmable computing block 214A and the second programmable computing block 214B can be used as inputs for the third programmable computing block 214C.

As previously mentioned, the digital inputs/outputs of the programmable computing blocks 214 are in binary format; thus, the programmable computing blocks 214 can be chained as desired. The output of a programmable computing block 214 (e.g., a format converter circuit 212) can be directly connected to the input of another programmable computing block 214 (e.g., a search/write circuit 204). This configuration provides a flexible and scalable structure, enabling complicated computations to be performed through the chaining of multiple blocks.

Each of the first programmable computing block 214A, the second programmable computing block 214B, and the third programmable computing block 214C can be programmed to perform a different predetermined function. In this example, the third programmable computing block 214C is programmed with a multi-variable function while the first programmable computing block 214A and the second programmable computing block 214B are each programmed with a respective one-variable function. The first programmable computing block 214A and the second programmable computing block 214B may each be programmed with a respective multi-variable function. This allows a wide range of computations to be performed within the same aCAM device 108, making it a versatile tool for various computing applications. The predetermined functions can be any mathematical or computational function, ranging from simple arithmetic operations to complicated machine learning algorithms, depending on the specific requirements of the application.

Although this disclosure describes or illustrates particular operations as occurring in a particular order, this disclosure contemplates the operations occurring in any suitable order. Moreover, this disclosure contemplates any suitable operations being repeated one or more times in any suitable order. Although this disclosure describes or illustrates particular operations as occurring in sequence, this disclosure contemplates any suitable operations occurring at substantially the same time, where appropriate.

While this disclosure has been described with reference to illustrative implementations, this description is not intended to be construed in a limiting sense. Various modifications and combinations of the illustrative implementations, as well as other implementations of the disclosure, will be apparent to persons skilled in the art upon reference to the description. It is therefore intended that the appended claims encompass any such modifications or implementations.

What is claimed is:

1. A device comprising:
a first programmable computing block comprising:
a first analog content addressable memory array comprising first analog content addressable memory cells arranged in rows and columns;
first sense amplifiers connected to the rows of the first analog content addressable memory array;
first inverters connected to the first sense amplifiers; and
a first format converter circuit connected to the first inverters, the first format converter circuit configured to receive a Gray code from the first inverters and to convert the Gray code to a binary code.

2. The device of claim 1, wherein the first format converter circuit comprises:
XOR gates arranged in a cascading configuration.

3. The device of claim 1, wherein the Gray code is unsigned and the binary code is signed.

4. The device of claim 1, further comprising:
a second programmable computing block comprising a search/write circuit connected to the first format converter circuit of the first programmable computing block.

5. The device of claim 1, further comprising:
a second programmable computing block comprising:
a second analog content addressable memory array comprising second analog content addressable memory cells arranged in rows and columns;
second sense amplifiers connected to the rows of the second analog content addressable memory array;
second inverters connected to the second sense amplifiers; and
a second format converter circuit connected to the second inverters, the second format converter circuit configured to receive a Gray code from the second inverters and to convert the Gray code to a binary code; and
a third programmable computing block comprising a search/write circuit connected to the first format converter circuit of the first programmable computing block and to the second format converter circuit of the second programmable computing block.

6. The device of claim 1, further comprising:
a processor connected to the first format converter circuit of the first programmable computing block.

7. The device of claim 1, wherein a respective row of the first analog content addressable memory array comprises a respective match line connected to a respective sense amplifier of the first sense amplifiers, and the first analog content addressable memory cells along the respective row each comprise:
a first pull-down transistor;
a second pull-down transistor, the first pull-down transistor and the second pull-down transistor being connected in series between the respective match line and a reference node;
a first memory circuit configured to store a first upper bound of a first range and to activate the first pull-down transistor when an analog input value is less than the first upper bound of the first range; and
a second memory circuit configured to store a first lower bound of the first range and to activate the second pull-down transistor when the analog input value is greater than the first lower bound of the first range.

8. The device of claim 7, wherein:
the first memory circuit comprises:
a first memristor-transistor pair connected to the first pull-down transistor;
the second memory circuit comprises:
a second inverter connected to the second pull-down transistor; and
a second memristor-transistor pair connected to the second inverter.

9. A system comprising:
an analog content addressable memory device comprising an analog content addressable memory array, a sensing circuit connected to the analog content addressable memory array, an inverting circuit connected to the sensing circuit, and a format converter circuit connected to the inverting circuit;
a processor; and a non-transitory computer readable medium storing instructions which, when executed by the processor, cause the processor to:
    calculate decimal outputs of a predetermined function for a set of decimal inputs;
    encode the decimal outputs into Gray codes, the Gray codes comprising quantized representations of the decimal outputs;
    generate mappings that associate ranges of the decimal inputs with values for bit positions within the Gray codes; and
    program the analog content addressable memory array of the analog content addressable memory device based on the mappings to directly output the values for the bit positions.

10. The system of claim 9, wherein successive values of the Gray codes differ by only one bit.

11. The system of claim 9, wherein the format converter circuit is configured to convert the values for the bit positions from Gray representation to binary representation.

12. The system of claim 9, wherein the format converter circuit comprises XOR gates arranged in a cascading configuration.

13. A method comprising:
    calculating decimal outputs of a predetermined function for a set of decimal inputs;
    encoding the decimal outputs into Gray codes, the Gray codes comprising quantized representations of the decimal outputs;
    generating mappings that associate ranges of the decimal inputs with values for bit positions within the Gray codes; and
    programming an analog content addressable memory device based on the mappings to directly output the values for the bit positions.

14. The method of claim 13, wherein successive values of the Gray codes differ by only one bit.

15. The method of claim 13, wherein programming the analog content addressable memory device comprises:
    programming memristors of the analog content addressable memory device to store the ranges of the decimal inputs of the mappings.

16. The method of claim 13, further comprising:
    providing an input value to the analog content addressable memory device;
    converting the values for the bit positions from Gray representation to binary representation; and
    obtaining the values for the bit positions from the analog content addressable memory device.

17. The method of claim 16, wherein the analog content addressable memory device searches the ranges of the decimal inputs for the input value and provides the set of the values for the bit positions based on which of the ranges of the decimal inputs are matched by the input value.

18. The method of claim 13, wherein the analog content addressable memory device comprises an analog content addressable memory array, an inverting circuit connected to the analog content addressable memory array, and a converter circuit connected to the inverting circuit.

19. The method of claim 13, wherein the predetermined function is a one-variable function.

20. The method of claim 13, wherein the predetermined function is a multi-variable function.

* * * * *